United States Patent [19]

Sashiki et al.

[11] Patent Number: 4,527,645
[45] Date of Patent: Jul. 9, 1985

[54] COMBINATORIAL WEIGHING METHOD AND APPARATUS

[75] Inventors: Takashi Sashiki, Nagaokakyo; Keiko Sakaeda, Kyoto, both of Japan

[73] Assignee: Kabushiki Kaisha Ishida Koki Seisakusho, Kyoto, Japan

[21] Appl. No.: 596,273

[22] Filed: Apr. 3, 1984

[30] Foreign Application Priority Data

Apr. 27, 1983 [JP] Japan .................. 58-74829

[51] Int. Cl.³ ................... G01G 19/22; G01G 13/02
[52] U.S. Cl. ........................ 177/1; 177/25; 177/123
[58] Field of Search ............ 177/1, 25, 50, 123

[56] References Cited

U.S. PATENT DOCUMENTS

4,137,976  2/1979  Grayson, Jr. .............. 177/1
4,418,772  12/1983  Fukuda ..................... 177/1
4,448,272  5/1984  Keller et al. .............. 177/25 X Primary Examiner—George H. Miller, Jr.
Attorney, Agent, or Firm—Staas & Halsey

[57] ABSTRACT

A combinatorial weighing system having N weighing machines for weighing out articles to a final target weight value P which is greater than the maximum weighing capacity of the system. The system operates by discharging articles from all N weighing machines, discharging articles from some of the N weighing machines one time at most, and obtaining a difference value between the final target weight value P and the total weight of articles discharged in the foregoing steps. A combinatorial computation is then performed using the difference value as a target weight value Y, and articles are discharged from a combination of weighing machines selected by the combinatorial computation. The total weight value of articles discharged in the foregoing steps attains a value equal to the final target weight value P or closest to the final target weight value P within preset allowable limits.

24 Claims, 4 Drawing Figures

COMBINATORIAL WEIGHING METHOD AND APPARATUS

CROSS-REFERENCE TO RELATED APPLICATIONS

This application is related to U.S. application Ser. No. 505,479 filed June 17, 1983 and U.S. application Ser. No. 506,797 filed June 22, 1983, which are assigned to the Assignee of the subject application.

BACKGROUND OF THE INVENTION

This invention relates to a combinatorial weighing system, particularly a combinatorial weighing method and apparatus for a case where weighing is executed to obtain a target weight value greater than the maximum load of the apparatus, wherein the target value can be weighed out through only a small number of weighing operations.

A combinatorial weighing apparatus has a plurality of weighing machines each consisting of a weighing hopper and a weight sensor associated with the weighing hopper. According to a known combinatorial weighing method using the aforesaid apparatus, combinatorial weighing is carried out by weighing articles which have been introduced into the weighing hoppers of the weighing machines, selecting the combination of weighing machines (referred to as the "optimum" combination) that gives a total weight value equal to a target weight value or closest to the target weight value within preset allowable limits, discharging only those articles contained by the weighing hoppers of the selected weighing machines, and subsequently replenishing the emptied weighing hoppers with new articles to prepare for the next weighing cycle. The foregoing sequence of steps is repeated to carry out a continuous, highly accurate weighing operation automatically.

In an automatic weighing apparatus that operates based on the above-described combinatorial weighing method, the target weight value is determined within a substantially constant range and the optimum hopper capacity is selected as an apparatus design specification within this range. In addition, the quantity of articles supplied to each weighing hopper and the supply timing are adjusted in advance in such a manner that the combination obtained will give the optimum precision, as will be described later. However, in one and the same production line, certain conditions in the production process give rise to situations where weighing must be carried out using a target weight value which is greater (several, times greater in some instances) than the above-mentioned usual target weight value. Although such situations may be temporary, they occur with some frequency.

In order to perform weighing with a combinatorial weighing apparatus where the weight of the articles to be weighed out exceeds the weighing capacity of the apparatus, it is common practice to either: (A) divide a target weight value into a number of weight values X1, X2, X3 . . . each of which is less than the maximum weighing capacity of the apparatus, and then simply repeat the combinatorial weighing operation a plurality of times; or (B) divide the target weight into a number of weight values, each of which is less than the maximum weighing capacity of the apparatus and then, in conducting weighing from the second weighing operation onward, correct the target weights X2, X3, . . , which will prevail in the respective weighing operations, by any error in the results of the preceding weighing operation.

Figure 1:
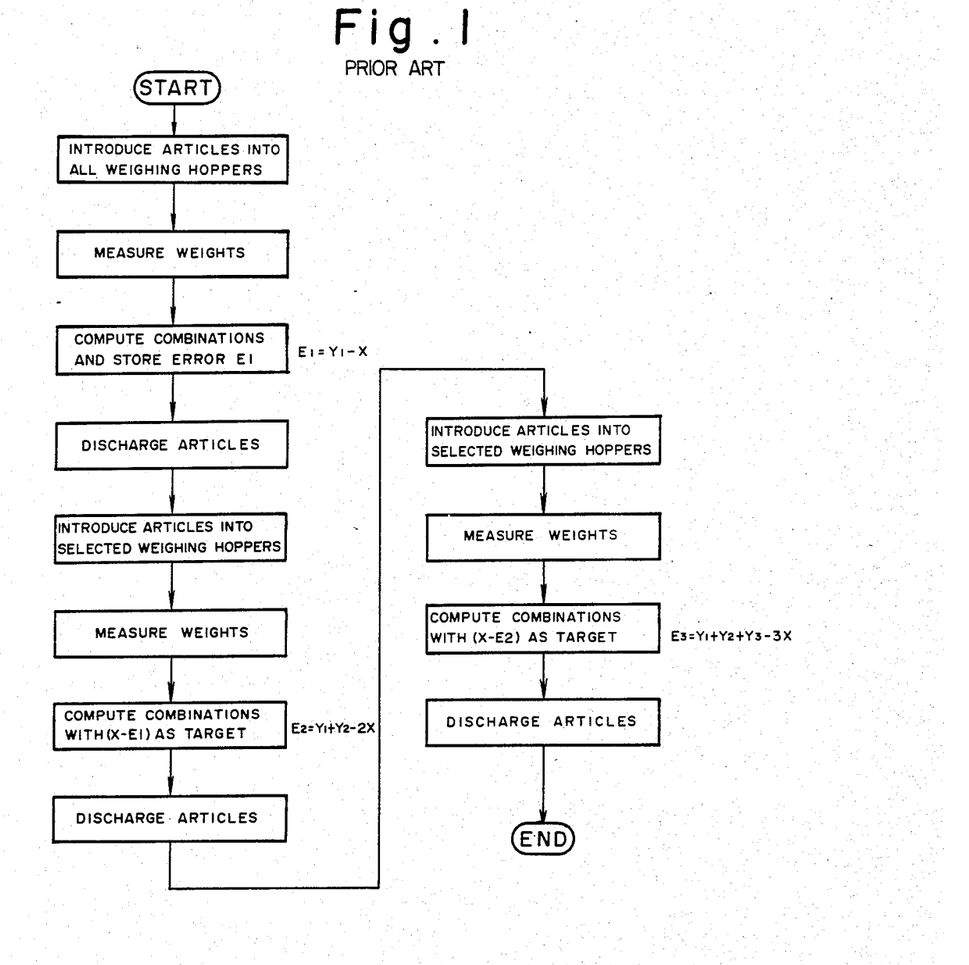
FIG. 1 is a flowchart of a combinatorial weighing method according to the prior art.

Weighing method (B) outlined above will now be described in greater detail with reference to the flowchart of FIG. 1. We will assume that the target weight value is 3X grams, and that X1=X, X2=X, X3=X. In order to weigh out 3X grams of the articles, method (B) proceeds in the following fashion:

(1) First, all of the weighing machines are supplied with articles to be weighed.

(2) The weights of the artcles fed into the weighing hoppers of the weighing machnes are measured (first weight measurement).

(3) Combinations are compuied with X1 (=X) grams serving as the target, and the difference between X and Y1 (which is the total weight value of the articles contained by those weighing machines that give the optimum combination), is stored in memory as an error E1 (=Y1−X).

(4) The articles are discharged from the weighing machines that give the optimum combination (first discharge operation).

(5) The emptied weighing hoppers of the weighing machines, that is, those that have discharged their articles, are supplied with articles afresh.

(6) The weights of the articles fed into each of the weighing hoppers of the weighing machines are measured (second weight measurement).

(7) Combinations are computed with $X2-E1$ ($=X-E1$) grams serving as the target, and the difference between the target value ($X-E1$) and Y2 (which is the total weight value of the articles contained by those weighing machines that give the optimum combination), is stored in memory as an error $E2(+Y1+Y2-2X)$. It should be noted that:

$$E2 = Y2 - (X - E1)$$
$$= Y1 + Y2 - 2X$$

(8) The articles are discharged from the weighing machines that give the optimum combination (second discharge operation).

(9) The weighing hoppers of the weighing machines that have discharged their articles are supplied with articles afresh.

(10) The weights of the articles fed into each of the weighing hoppers of the weighing machines are measured (third weight measurement).

(11) Combinations are computed with $X3-E2$ ($=X-E2$) grams serving as the target, and the articles are discharged from the weighing machines that give the optimum combination (third discharge operation). The end result is 3X grams of the articles.

A disadvantage encountered with the above-described target weight dividing method when weighing out articles to a weight greater than the maximum weighing capacity is that combinatorial computations must be performed a considerable number of times to obtain a target weight above the maximum weighing capacity, so that the method is not suitable for weighing at high speed. Another problem with the foregoing combinatorial weighing method is that there are instances where some weighing machines remain unselected for a prolonged period of time so that the weighing hoppers thereof retain their articles for too long. The reason for prolonged retention of articles in a weighing hopper is that the article batch has a peculiar weight which does not lend itself to selection. If article batches having peculiar weights grow in number because they are unfit for selection, a situation will eventually arise in which no desirable combinations can be obtained. Furthermore, articles such as frozen foods will thaw or spoil if retained in the weighing hoppers for an extended period of time. It is obvious, therefore, that prolonged retention of articles in unselected weighing hoppers is undesirable and should be avoided.

SUMMARY OF THE INVENTION

An object of the present invention is to provide a combinatorial weighing method and apparatus wherein articles can be weighed out to a target weight through a small number of weighing operations even if the target weight is greater than the maximum weighing capacity of the apparatus.

Another object of the present invention is to provide a combinatorial weighing method and apparatus wherein articles will not reside in weighing hoppers for a prolonged period of time, and wherein a decline in accuracy and spoilage of articles, caused by article batches of peculiar weights, can be prevented.

A further object of the present invention is to provide a combinatorial weighing method and apparatus wherein, in a final combinatorial weighing operation, a final batch of articles can always be discharged from approximately half of the weighing machines constituting the apparatus, so that combinatorial weighing can be carried out with a high degree of precision.

According to the present invention, the foregoing objects are attained by providing a combinatorial weighing system which uses a combinatorial weighing apparatus having N weighing machines for weighing out articles contained by the weighing machines. The system is capable of performing weighing using a final target weight value P which is greater than the maximum weighing capacity of the combinatorial weighing apparatus. In such case, the system operates by discharging articles from all N weighing machines, discharging articles from some of the N weighing machines one time at most, obtaining a difference value between the final target weight value P and the total weight of articles discharged in the foregoing steps, performing a combinatorial computation using the difference value as a target weight value Y, discharging articles from a combination of weighing machines selected by the combinatorial computation, and making the total weight value of articles discharged in the foregoing steps attain an optimum value; namely, a value equal to the final target weight value P or closest to the final target weight value P within preset allowable limits.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Before proceeding with a detailed description of a preferred embodiment of the present invention, we will discuss in brief the supply of articles to each of the weighing machines of a combinatorial weighing apparatus, as well as the maximum weighing capacity of the weighing apparatus.

Let us examine a case where articles having a combined weight of P grams are to be weighed out in a combinatorial weighing apparatus having N-number of weighing machines. The target weight value will therefore be P grams. To obtain the target weight, the amount of articles fed to each weighing machine should be adjusted to have an average value of 2P/N grams when N is even, and $2P/(N\pm1)$ grams grams when N is odd. The reason is as follows. The number of combinations that can be computed by a combinatorial weighing apparatus composed of N weighing machines (where a combination may be made up of only one weighing machine or up to all N of the weighing machines) is $2^N-1$. When N is even, combinations composed of N/2 weighing machines will be the largest in number among the $2^N-1$ combinations. When N is odd, combinations composed of $(N+1)/2$ or of $(N-1)/2$ weighing machines will be the largest in number among the $2^N-1$ combinations. For example, when $N=10$, only ten combinations made up of one weighing machine each will exist, whereas the number of combinations composed of five (i.e., N/2) weighing machines will be 252 in number. Accordingly, the weight of the articles fed into each weighing machine of the apparatus should be in the neighborhood of $1/(N/2)$ of the target value P, i.e., 2P/N. In a case where the weight values of the individual article batches are controlled in this manner, there is a very high probability that the sought combination (i.e., the "optimum" combination) will exist in the combinations composed of N/2 or $(N/2)\pm0.5$ weighing machines, thereby enabling an extremely accurate weighing operation. Therefore, each of the weighing machines is supplied with a batch of articles having a weight of approximately 2P/N (where N is even) or $2P/(N\pm1)$ (where N is odd), with P being the target weight. By way of example, if the number N of weighing machines is ten, combinations made up of N/2 or five combinations will be the largest in number. Therefore, the quantity of articles supplied to each of the weighing machines, as well as the supply time, is adjusted in such a manner that a combination equal or closest to the target value P is obtained from among the combinations consisting of five weighing machines. If the target value is 1000 grams, an adjustment is effected so that approximately 200 grams of the articles are supplied to each of the weighing machines, with there being a suitably small variance in the weight of the article batches from one weighing machine to another. Note that if the average amount of articles supplied to each of ten weighing machines is 200 grams, then the largest target value that can be set (namely the maximum weighing capacity) is limited to about 1000 grams ($=200\times5$). If precision is sacrificed, however, the maximum weighing capacity can be made greater than 1000 grams.

The foregoing description deals with a standard combinatorial weighing apparatus in which all N of the weighing machines participate in the combinatorial computation process. With a high-speed combinatorial weighing apparatus, however, the number of weighing machines provided is M (=14 or 15), which is greater than the number N (=10) needed for the combinatorial computations, and the combination selection process is conducted using a number of weighing machines that is less than a given number, i.e., less than N. The weighing machines belonging to the selected combination discharge their articles and are then resupplied. While these discharge and resupply operations are in progress, the next combination selection operation is performed using the M−N (four or five) weighing machines which did not participate in the preceeding combination selection, as well as those weighing machines which did participate but which were not selected. The purpose of this type of processing is to shorten the weighing cycle.

In the high-speed combinatorial weighing apparatus, regulation of the amount of articles supplied to each weighing machine, is performed based on the N weighing machines that participate in the selection processing, and not on the total number M of machines.

In the discussion that follows, a standard other than the high speed combinatorial weighing method will be described, with the total number of weighing machines being N. It should be noted, however, that the present invention can be applied in a similar manner to the above-described high-speed combinatorial weighing method where M is the total number of weighing machines.

In a combinatorial weighing operation of the type described above, there are cases where it is required to weigh out articles in excess of the maximum weighing capacity of the weighing apparatus. In other words, there are instances where the target value P is greater than the value of the maximum weighing capacity. In such cases, in accordance with the present invention, a multiple weighing operation, described below, is performed by which articles can be weighed out to any target value greater than the maximum weighing capacity through a fewer number of weighing operations and with greater accuracy than heretofore possible in the prior art. More specifically, depending upon the relationship between the values of the target weight and maximum weighing capacity, a so-called "total discharge" is performed in which articles are discharged in suitable fashion from all weighing machines, and/or a so-called "partial discharge" is performed in which articles are discharged from an arbitrary number K ($1 \leq K < N$) of the weighing machines. Through such processing, the target value (remaining weight value) of the final weighing operation, namely the weighing operation performed last, will be approximately $(N/2) \cdot a$, where N is even, or $$\frac{N+1}{2} \cdot a,$$

where N is odd. Here, a represents the average weight of the articles supplied to each weighing machine. As a result of the foregoing processing, the present invention exhibits the following advantages. Specifically, let X represent the weight of the articles weighed out by one weighing operation, where the target value P is greater than the maximum weighing capacity of the weighing apparatus:

(1) where $X < P < 3X$ holds, performing one partial discharge and one combinatorial weighing operation will suffice;

(2) where $3X < P$ holds, performing one or more total discharges, one partial discharge and one combinatorial weighing operation will suffice; and (3) where $3X = P$, $5X = P$, ..., hold, performing one or more total discharges and one combinatorial weighing operation will suffice.

Figure 2:
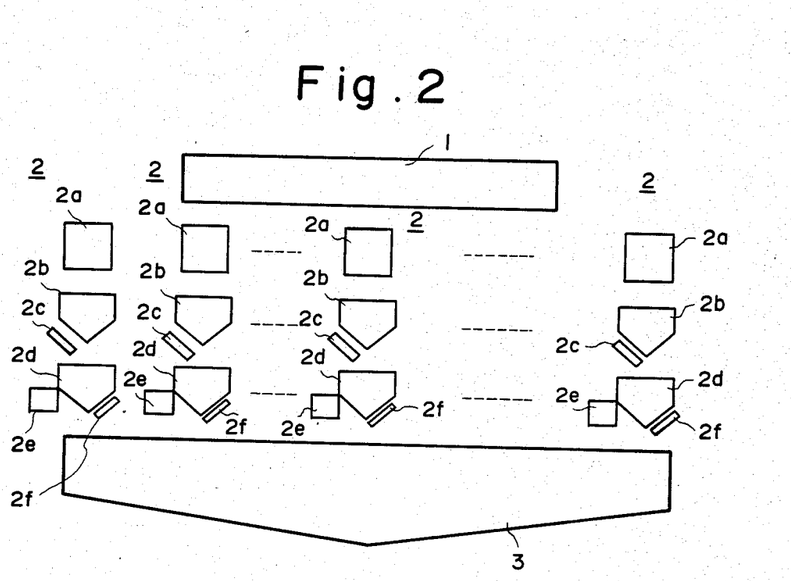
FIG. 2 is a schematic diagram of the construction of a combinatorial weighing apparatus to which the present invention can be applied.

FIG. 2 is a schematic diagram showing, in simplified form, the mechanism of a combinatorial weighing apparatus to which the present invention can be applied. Numeral 1 denotes a main feeder of vibratory conveyance type. Articles to be weighed are introduced into the main feeder 1 and are imparted with vibratory motion for a predetermined length of time so as to be dispersed radially outward from the center of the main feeder. Numerals 2, 2 ... denote n-number of equally spaced weighing stations which are arranged around the main feeder 1 along radially extending lines to receive the articles dispersed by the main feeder. Each weighing station 2 includes a dispersing feeder 2a, a pool hopper 2b, a pool hopper gate 2c, a weighing hopper 2d, a weight sensor 2e, and a weighing hopper gate 2f. The dispersing feeder 2a may comprise solely a substantially circular bowl member which has a plurality of gates on its outer circumference, and which is vibrated so that articles will be transferred therealong away from the center of the bowl; or means having a plurality of troughs, provided with feeders, arranged radially about the center of a small circular bowl. In either case, each dispersing feeder 2a is so arranged that a predetermined weight of the articles can be introduced into the corresponding underlying pool hopper 2b. With the dispersing feeder comprising the substantially circular bowl, the quantity of articles supplied to the corresponding weighing hopper 2b is regulated by controlling the gate opening time or opening area. With the dispersing feeder having the troughs and feeders, the supply of articles to the weighing hopper 2d is regulated by controlling feeder vibration time and vibration amplitude. The pool hopper gate 2c is provided on each pool hopper 2b in such a manner that the articles received in the pool hopper 2b are released into the weighing hopper 2d when the pool hopper gate 2c is opened. Each weighing hopper 2d is provided with a weight sensor 2e of its own. The weight sensor 2e is operable to measure the weight of the articles introduced into the corresponding weighing hopper 2d, and to apply an electrical signal indicative of the measured weight to a combination control unit (not shown). In a final weighing operation, the combination control unit selects a combination of articles (the "optimum" combination) giving a total weight equal or closest to the target weight value, as will be described below in further detail. Each weighing hopper 2d is provided with its own weighing hopper gate 2f. A drive control unit (not shown), upon receiving the signals from each of the weight sensors, produces a signal to open only the weighing hopper gates 2f of those weighing hoppers 2d that give the optimum combination, these gates 2f discharging the articles from the corresponding weighing hoppers 2d into a common chute 3 where they are collected together. The collecting chute 3 has the shape of a funnel and is so arranged as to receive the articles from any of the circularly arrayed weighing hoppers 2d via the hopper gates 2f, which are located above the funnel substantially along its outer rim. The articles received by the collecting chute 3 are collected at the centrally located lower end thereof by falling under their own weight or by being forcibly shifted along the inclined wall of the funnel by a mechanical scraper or the like (not shown). The articles collected by the collecting chute 3 are discharged into a packaging machine (not shown).

Figure 3:
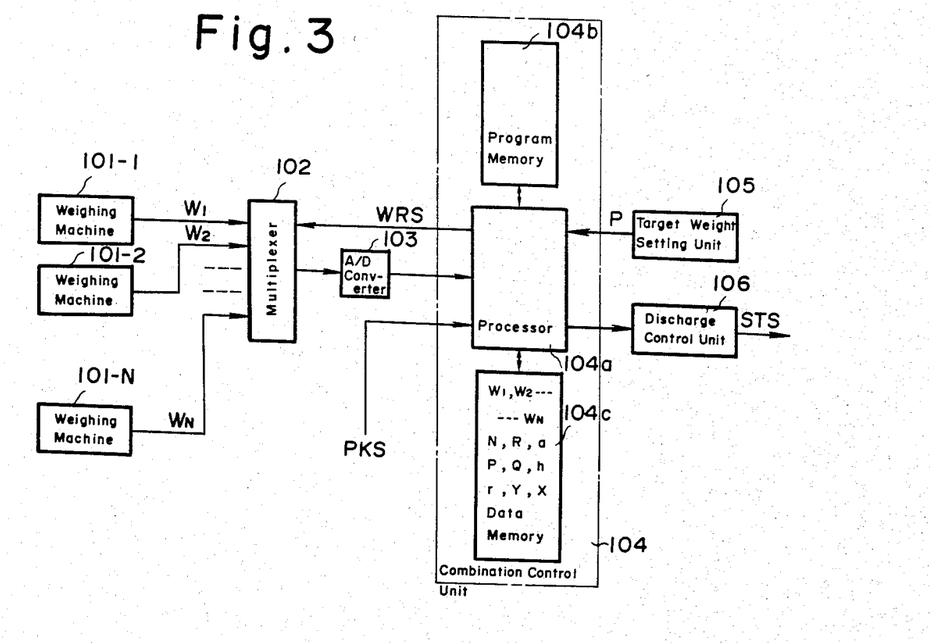
FIG. 3 is a block diagram of an embodiment of a combinatorial weighing apparatus according to the present invention.
Figure 4:
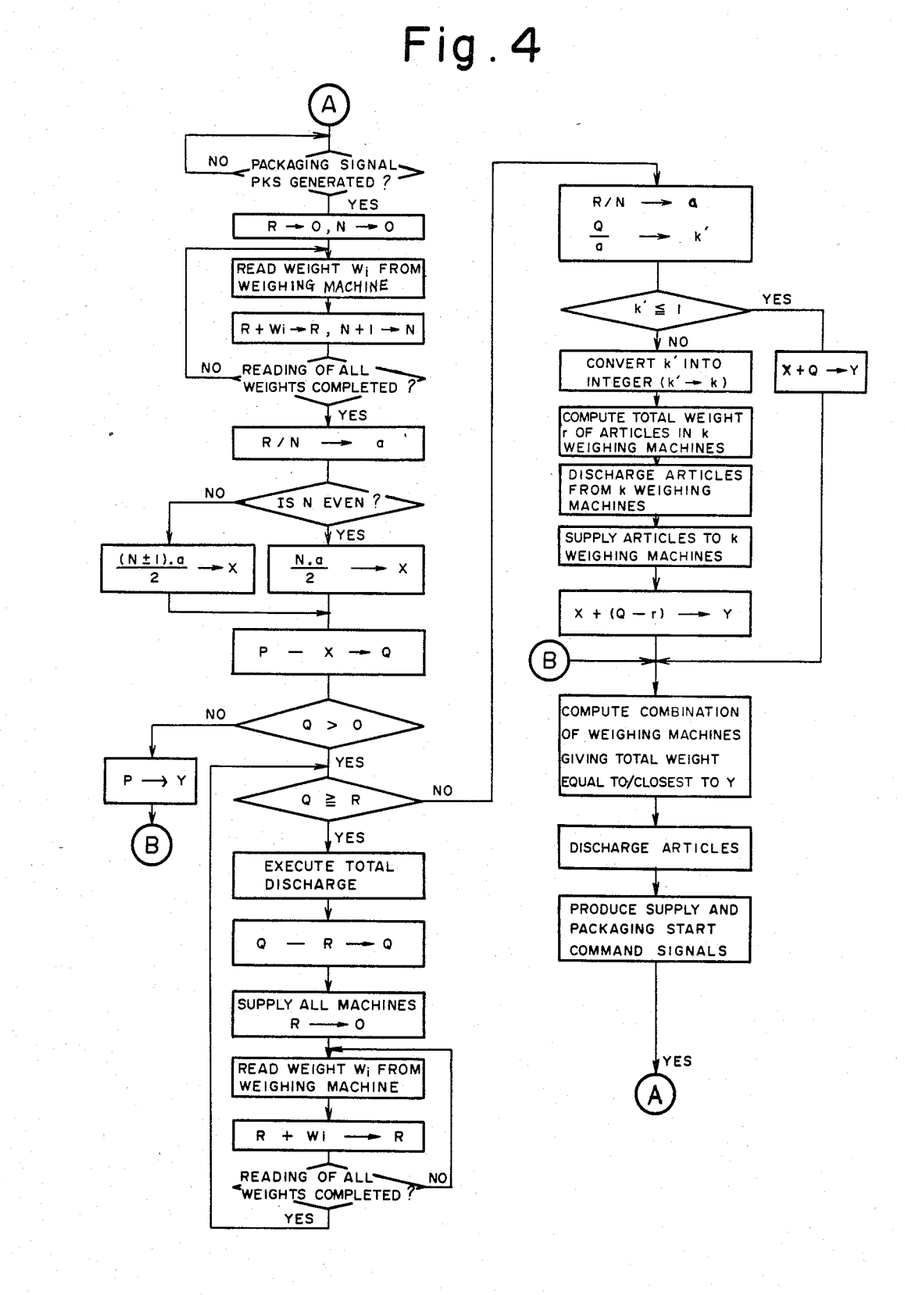
FIG. 4 is a flowchart for processing according to the present invention.

Reference will now be had to the block diagram of FIG. 3 showing a combinatorial weighing apparatus embodying the present invention, and to the flowchart for the FIG. 4 of processing associated with the apparatus of FIG. 3.

In FIG. 3, numerals 101-1, 101-2 . . . 101-N denote weighing machines of which there are N in number, each comprising the weighing hopper 2d and weight sensor 2e for measuring the weight of a batch of articles supplied thereto. Analog output voltages, which are indicative of the weights measured thereby, are produced by the weighing machines 101-1, 101-2 . . . 101-N and applied to a multiplexer 102, which delivers the analog voltages as an output in sequential fashion in response to a weight read signal WRS, described below. An analog-to-digital (A/D) converter 103 converts the analog weight voltages, which are received from the multiplexer 102, into digital weight signals. The digital output of the A/D converter 103 is applied to a combination control unit 104. The latter includes a processor 104a which receives the output of the A/D converter 103, a program memory 104b for storing a combinatorial processing program, and a data memory 104c. The processor 104a executes combinatorial processing, described below, on the basis of the instructions constituting the processing program. A target weight setting unit 105 sets the target weight value P, which is applied to the processor 104a. Numeral 106 denotes a discharge control unit.

The operation of the combination control unit 104 having the foregoing construction will now be described in conjunction with the flowchart of FIG. 4.

We will assume that a multiplicity of articles to be weighed have been distributed among the N-number of weighing machines 101-1, 101-2 . . . 101-N before the start of operation. When the aforementioned packaging machine (not shown) applies a signal PKS to the combination control unit 104 to indicate that a packaging operation is possible, the processor 104a responds by performing the operations N→0, R→0 (where R is the total weight of articles supplied to all weighing machines) and by sending the weight read signal WRS to the multiplexer 102. The latter responds to the weight read signal WRS by sequentially supplying the A/D converter 103 with analog weight voltages $W_1, W_2 \ldots W_N$ obtained from the respective weighing machines 101-1, 101-2 . . . 101-N. The A/D converter 103 converts each analog weight voltage into a digital value and applies a signal indicative of the digital value to the processor 104a. Next, operation proceeds as follows:

(A) With each input of a weight value $W_i$ (where i=1, 2 . . . N) from the corresponding weighing machine, the processor 104a, in accordance with the combinatorial processing program stored in the program memory 104b, performs the operations:

$$N+1 \rightarrow N \qquad (1)$$

(where the initial value of N is zero)

$$R+W_i \rightarrow R \qquad (2)$$

(where the initial value of R is zero) and causes N, R and each weight value $W_i$ to be stored in the data memory 104c.

(B) Using the total weight R (defined above) and the number N of weighing machines, the processor 104a performs the operation:

$$R/N \rightarrow a \qquad (3)$$

to compute the average weight a of the article batches introduced into each weighing machine, stores a in the data memory 104c, performs the operation:

$$N/2 \cdot a \rightarrow X \qquad (4)$$

if N is even or the operation:

$$\frac{N+1}{2} \cdot a \rightarrow X \qquad (5)$$

if N is odd, and stores X in the data memory 104c. It will become clear hereinafter that X is a value approximately equivalent to a target weight value Y used in a final combinatorial computation, and is the value which will provide an optimum combination giving the best accuracy for the article supply conditions in the combinatorial weighing apparatus (i.e., for the total amount R of the articles supplied to the entirety of the weighing machines).

(C) Thereafter, the processor 104a performs the operation:

$$P-X \rightarrow Q \qquad (6)$$

to compute the difference Q between X and the set target weight value P. It should be noted that Q represents a residual weight obtained when X grams is assumed to be the weight of the articles discharged last.

(D) Next, the processor 104a discriminates whether Q is larger than zero. If $Q \leq 0$ is found to hold, namely if the set target weight value P is less than the maximum weighing capacity (the above-mentioned X) of the weighing apparatus, then P→Y is performed and ordinary combinatorial processing, namely combinatorial weighing for a case where the maximum weighing capacity is not exceeded, is executed in accordance with steps (E) and (F) described hereinbelow.

(E) This step is to find a combination (optimum combination) of weighing machines giving a total combined weight equal to the target weight value Y or closest to Y within preset allowable limits. An exemplary method of finding the optimum combination may be found in the specification of Japanese patent application No. 58-044811 corresponding to U.S. application Ser. No. 590,356 filed Mar. 16, 1984.

(F) If an optimum combination is found, then a bit pattern indicative of the optimum combination is applied from the processor 104a to the discharge control unit 106, which responds by causing the weighing machines specified by the bit pattern to discharge their articles into the packaging machine, and which subsequently causes these weighing machines to be resupplied with articles and applies a packaging start command signal STS to the packaging machine. The processor 104a then waits for the arrival of the next signal PKS from the packaging machine.

(G) If $Q>0$ is found to hold in step (D), then a decision is rendered as to whether $Q \geq R$ holds. If the quantity Q of remaining articles is equal to or greater than R ($Q \geq R$), then the processor 104a delivers a total discharge signal to the discharge control unit 106, as a result of which all of the weighing machines will discharge their articles, and performs the operation:

$$Q-R \to Q \tag{7}$$

to update Q. Thenceforth, all weighing machines are resupplied with articles, and the processor 104a performs the operation $R \to 0$.

(H) After vibrations induced in the weighing machines by the introduction of articles thereto subside (that is, when the indicated weight values stabilize), the processor 104a applies the weight value read signal WRS to the multiplexer 102, sequentially reads the weight values $W_i$ ($i=1, 2 \ldots N$) indicative of the weight of the article batches in the respective weighing machines, and performs the operation of expression (2) each time $W_i$ is read, thereby to compute the total weight R.

(I) Thereafter, Q and R are again compared in magnitude and steps (G) and (H) are repeated until $Q<R$ is established.

(J) When $Q<R$ holds, the average weight a is computed in accordance with expression (3), and the operation:

$$Q/a \to k'' \tag{8}$$

is preformed to compute k'. It should be noted that k represents the number of weighing machines needed to discharge the residual quantity Q.

(K) Next, the processor 104a determines whether $k' \leq 1$ holds. If it does, then the processor executes the operation:

$$X+Q \to Y \tag{9}$$

to compute the target weight value Y employed in the final combinatorial computation, and executes steps (E) and (F).

(L) If $k'>1$ is found to hold, k' is converted into an integer by rounding off, raising or discarding decimals (with the resulting integer being designated k), k-number of machines are selected in order starting from the lower numbered weighing machines, and the total weight r of the articles in these weighing machines is computed.

(M) This is followed by delivering a bit pattern signal, which specifies the k weighing machines, to the discharge control unit 106, in response to which the control unit 106 causes the k weighing machines to discharge their articles. Thereafter, the k weighing machines are resupplied.

(N) Next, the processor 104a executes the operation:

$$X+(Q-r) \to Y \tag{10}$$

to compute the target weight value Y employed in the final combinatorial computation, and executes steps (E) and (F). Here, r represents the total value of the article weights discharged from the k weighing machines in step (L). This ends the combinatorial weighing processing for a target weight above or below the total weighing capacity of the weighing apparatus.

For the sake of simplicity, articles are supplied to all N weighing machines in the description given hereinabove. In actual practice, however, some weighing machines are at times left empty for reasons such as weight sensors being subjected to a zero adjustment, malfunctions in a feeding device or a command which forbids automatic operation. In cases such as these, the $N'$ ($N' \leq N$) weighing machines which are not empty are detected based on the analog voltage weight values $W_1$, $W_2 \ldots W_N$, and N in the foregoing discussion is substituted by $N'$. In other words, the processing step $N \to N'$ is executed.

In accordance with the present invention as described and illustrated hereinabove, a total discharge and/or a partial discharge is performed depending upon the relation between a target weight value and the maximum weighing capacity of the weighing apparatus, and only a single combinatorial process step need be executed at the end to obtain $$\frac{N}{2} \cdot a \text{ or } \frac{N+1}{2} \cdot a$$

as the target weight value. This makes possible high-speed weighing due to fewer weighing operations, and allow weighing to be carried out with great precision. Furthermore, since a total discharge is performed in instances where the residual quantity Q is greater than the total weight R of all weighing machines, articles do not reside in the weighing hoppers for extending periods of time due to prolonged non-selection of the corresponding weighing machines. This prevents deterioration of products such as frozen foodstuffs.

As many apparently widely different embodiments of the present invention can be made without departing from the spirit and scope thereof, it is to be understood that the invention is not limited to the specific embodiments thereof except as defined in the appended claims.

What we claim is:

1. A combinatorial weighing method, which uses a combinatorial weighing apparatus having N weighing machines, for weighing out N batches of articles respectively contained by the weighing machines, to a final target weight value P which is greater than the maximum weighing capacity of the combinatorial weighing apparatus, comprising the steps of:
   (a) discharging batches of articles from all of the N weighing machines an integral number of times;
   (b) discharging batches of articles from a selected at least one of the N weighing machines one time at most;
   (c) obtaining a difference value between the final target weight value P and the total weight of the batches of articles discharged in said steps (a) and (b);
   (d) performing a combinatorial computation using the difference value as a target weight value Y to select a combination of weighing machines containing batches of articles having a total weight value equal or closest to the target weight value Y within preset allowable limits;
   (e) discharging the batches of articles corresponding to the combination of weighing machines selected by the combinatorial computation of said step (d); and
   (f) carrying out said steps (a) through (e) so that the total weight value of the batches of articles discharged in said steps (a), (b) and (e) attains a value equal to the final target weight value P or closest to the final target weight value P within preset allowable limits.

2. The combinatorial weighing method according to claim 1, further comprising the step of (a') determining the maximum weighing capacity of the combinatorial weighing apparatus, which is equal to a combinatorial weighing value X for obtaining a combination of maximum accuracy, after articles are supplied to each of the weighing machines of the combinatorial weighing apparatus, wherein at least the number of times articles are discharged from all weighing machines in said step (a) and the number of weighing machines which participate in said step (b) are determined based on the magnitude of an approximate difference value Q between the final target weight value P and the combinatorial weighing value X (Q=P−X).

3. The combinatorial weighing method according to claim 2, wherein said step (a') comprises computing the combinatorial weighing value X from X=N/2·a, where a is the average weight of articles supplied to the N weighing machines, and where N is an even number.

4. The combinatorial weighing method according to claim 3, further comprising the step of (a'') comparing the magnitude of the approximate difference value Q to the magnitude of a total weight R of articles supplied to all N weighing machines, and updating the approximate difference value Q by subtracting the total weight R from Q (Q−R→Q) where the result of the comparison is that Q>R, wherein said step (a) comprises discharging articles from all N weighing machines when Q≧R, supplying articles to all N weighing machines after the discharge, and thereafter repeating the discharge of articles from all N weighing machines and the supply of articles to all N weighing machines until an inequality Q<R is established by said comparing step (a'').

5. The combinatorial weighing method according to claim 4, further comprising, after the inequality Q<R is established by said comparing step (a''), the step (b') of dividing the difference value Q by the average weight a of the articles supplied to the N weighing machines, wherein said step (b) is performed based upon the result of said dividing step (b').

6. The combinatorial weighing method according to claim 5, wherein said step (c) comprises computing the target weight value Y by performing the operation X+(Q−r)→Y, where r is the total weight of articles discharged by some of the weighing machines in said step (b) and Q is the updated approximate difference value determined in said step (a'').

7. The combinatorial weighing method according to claim 2, wherein said step (a') comprises computing the combinatorial weighing value X from a selected one of $$X = \frac{N+1}{2} \cdot a \text{ and } X = \frac{N+1}{2} \cdot a,$$

where a is the average weight of articles supplied to the N weighing machines, and where N is an odd number.

8. The combinatorial weighing method according to claim 7, further comprising the step of (a'') comparing the magnitude of the approximate difference value Q to the magnitude of a total weight R of articles supplied to all N weighing machines, and updating the approximate difference value Q by subtracting the total weight R from Q (Q−R→Q) where the result of the comparison is that Q≧R, wherein said step (a) comprises discharging articles from all N weighing machines when Q≧R, supplying articles to all N weighing machines after the discharge, and thereafter repeating the discharge of articles from all N weighing machines and the supply of articles to all N weighing machines until an inequality A<R is established by said comparing step (a'').

9. The combinatorial weighing method according to claim 8, further comprising, after the inequality Q<R is established by said comparing step (a''), the step (b') of dividing the difference value Q by the average weight a of the articles supplied to the N weighing machines, wherein said step (b) is performed based upon the result of said dividing step (b').

10. The combinatorial weighing method according to claim 9, wherein said step (c) comprises computing the target weight value Y by performing the operation X+(Q−r)→Y, where r is the total weight of articles discharged by some of the weighing machines in said step (b) and Q is the updated approximate difference value determined in said step (a'').

11. A combinatorial weighing apparatus, having N weighing machines, for weighing out N batches of articles respectively contained by the weighing machines, to a final target weight value P which is greater than the maximum weighing capacity of the combinatorial weighing apparatus, comprising:

first means for discharging batches of articles from all of the N weighing machines an integral number of times;

second means for discharging batches of articles from a selected at least one of the N weighing machines one time at most;

third means for obtaining a difference value between the final target weight value P and the total weight of the batches of articles discharged by said first and second means;

fourth means for performing a combinatorial computation using the difference value as a target weight value Y to select a combination of weighing machines containing batches of articles having a total weight value equal or closest to the target weight value Y within preset allowable limits;

fifth means for discharging the batches of articles corresponding to the combination of weighing machines selected by the combinatorial computation performed by said fourth means; and sixth means for making the total weight value of the batches of articles discharged by said first, second and fifth means attain a value equal to the final target weight value P or closest to the final target weight value P within preset allowable limits.

12. The combinatorial weighing apparatus according to claim 11, further comprising:

seventh means for obtaining a combinatorial weighing value X which corresponds to the maximum weighing capacity of the combinatorial weighing apparatus, and which is for obtaining a combination of maximum accuracy, the combinatorial weighing value X being obtained after the batches of articles are supplied to each of the weighing machines of the combinatorial weighing apparatus; and eighth means for determining at least the number of times batches of articles are discharged from all weighing machines by said first means and the number of weighing machines from which batches of articles are discharged by said second means based on the magnitude of an approximate difference value Q between the final target weight value P and the combinatorial weighing value X (Q=P−X).

13. The combinatorial weighing apparatus according to claim 12, wherein said seventh means includes means for computing the combinatorial weighing value X from X=N/2·a, where a is the average weight of articles supplied to the N weighing machines, and where N is an even number.

14. The combinatorial weighing apparatus according to claim 13, further comprising ninth means for comparing the magnitude of the approximate difference value Q to the magnitude of a total weight R of articles supplied to all N weighing machines, and for updating the approximate difference value Q by subtracting the total weight R from Q (Q−R→Q) when the result of the comparison is Q≧R, wherein said first means includes means for discharging articles from all N weighing machines, means for supplying articles to all N weighing machines aftr the discharge, and means for repeating the discharge of articles from all N weighing machines and the supply of articles to all N weighing machines until an inequality Q<R is established by said ninth means.

15. The combinatorial weighing apparatus according to claim 14, further comprising tenth means for comparing the magnitude of the updated approximate difference value Q to the magnitude of a total weight R of articles supplied to all N weighing machines, and for dividing the updated approximate difference value Q by the average weight a when said ninth means determines that Q<R holds, and wherein said second means includes means for discharging articles from the selected at least one of the weighing machines, the number of which depends upon the result of dividing the difference value Q by the average weight a.

16. The combinatorial weighing apparatus according to claim 15, wherein said third means includes means for computing the target weight value Y by performing the operation X+(Q−r)→Y, where r is the total weight of articles discharged from some of the weighing machines by said second means and Q is the updated approximate difference value determined by said ninth means.

17. The combinatorial weighing apparatus according to claim 12, wherein said seventh means includes means for computing the combinatorial weighing value X from a selected one of $$X = \frac{N+1}{2} \cdot a \text{ and } X = \frac{N+1}{2} \cdot a,$$

where a is the average weight of articles supplied to the N weighing machines, and where N is an odd number.

18. The combinatorial weighing apparatus according to claim 17, further comprising ninth means for comparing the magnitude of the approximate difference value Q to the magnitude of a total weight R of articles supplied to all N weighing machines, and for updating the approximate difference value Q by subtracting the total weight R from Q (Q−R→Q) when the result of the comparison is Q≧R, wherein said first means includes means for discharging articles from all N weighing machines, means for supplying articles to all N weighing machines aftr the discharge, and means for repeating the discharge of articles from all N weighing machines and the supply of articles to all N weighing machines until an inequality Q<R is established by said ninth means.

19. The combinatorial weighing apparatus according to claim 18, further comprising tenth means for comparing the magnitude of the updated approximate difference value Q to the magnitude of a total weight R of articles supplied to all N weighing machines, and for dividing the updated approximate difference value Q by the average weight a when said ninth means determines that Q<R holds, and wherein said second means includes means for discharging articles from the selected at least one of the weighing machines, the number of which depends upon the result of dividing the difference value Q by the average weight a.

20. The combinatorial weighing apparatus according to claim 19, wherein said third means includes means for computing the target weight value Y by performing the operation X+(Q−r)→Y, where r is the total weight of articles discharged from some of the weighing machines by said second means and Q is the updated approximate difference value determined by said ninth means.

21. A combinatorial measuring method for measuring out a collection of articles having a final target value which is greater than a maximum accuracy combinatorial weighing value, comprising the steps of:
(a) supplying batches of articles to corresponding hoppers, the batches of articles having respective batch weight values;
(b) computing the maximum accuracy combinatorial weighing value based on the number of batches of articles and a total weight value which is equal to the sum of all of the batch weight values;
(c) computing a first approximate difference value based on the difference between the final target value and the maximum accuracy combinatorial weighing value;
(d) discharging all of the batches of articles from the hoppers an integral number of times until the difference between the final target value and the sum of the maximum accuracy combinatorial weighing value and the total weight value of the articles previously discharged, is less than the total weight of the batches of articles currently held in the hoppers, the difference corresponding to a second approximate difference value;
(e) discharging a selected number of batches from a corresponding selected number of hoppers based on the average of the batch weight values of all of the batches and the second approximate difference value;
(f) obtaining a target weight value corresponding to the difference between the final target value and the total weight of the batches of articles discharged in said steps (d) and (e);
(g) performing a combinatorial computation to select a combination of batches of articles having a combined total weight value equal or closest to the target weight value within preset allowable limits; and
(h) discharging the batches of articles corresponding to the combination of batches of articles selected in said step (g), so that the total weight value of the batches of articles discharged in said steps (d), (e) and (h) is equal to or closest to the final target value within preset allowable limits.

22. A combinatorial measuring method according to claim 21, wherein said step (d) comprises the substeps of:
(d′) comparing the magnitude of the first approximate difference value to the magnitude of the total weight value of all of the batches of articles held in the hoppers;

(d'') discharging all of the batches of articles from all of the hoppers when the first approximate difference value is greater than or equal to the total weight value of all of the batches of articles;

(d''') updating the first approximate difference value by subtracting the total weight of the articles discharged in said step (d'') from the first approximate difference value to obtain a new first approximate difference value;

(d'''') resupplying batches of articles to all of the hoppers when said discharging substep (d'') takes place; and (d''''') repeating said substeps (d') through (d'''') until it is determined in said substep (d') that the first approximate difference value is less than the total weight value of all of the batches of articles and using this first approximate difference value as the second approximate difference value.

23. The combinatorial weighing method according to claim 22, wherein said step (e) comprises the substeps of:

(e') comparing the magnitude of the second approximate difference value to the magnitude of a total weight value of all of the batches of articles held in the hoppers;

(e'') dividing the second approximate difference value by the average weight of the batch weight values to obtain a batch number when it is determined in said substep (e') that the second approximate difference value is less than the total weight value of all of the batches of articles; and (e''') discharging a number of hoppers holding batches of articles corresponding to the batch number determined in said substep (e'').

24. The combinatorial weighing method according to claim 21, wherein said step (e) comprises the substeps of:

(e') comparing the magnitude of the second approximate difference value to the magnitude of a total weight value of all of the batches of articles held in the hoppers;

(e'') dividing the second approximate difference value by the average weight of the batch weight values to obtain a batch number when it is determined in said substep (e') that the second approximate difference value is less than the total weight value of all of the batches of articles; and (e''') discharging a number of hoppers holding batches of articles corresponding to the batch number determined in said substep (e'').

* * * * *

UNITED STATES PATENT AND TRADEMARK OFFICE
CERTIFICATE OF CORRECTION

PATENT NO. : 4,527,645
DATED : JULY 9, 1985
INVENTOR(S) : TAKASHI SASHIKI ET AL.

It is certified that error appears in the above-identified patent and that said Letters Patent is hereby corrected as shown below:

Col. 1, line 51, "several," should be --several--.

Col. 2, line 11, "artcles" should be --articles--;
     line 14, "compuied" should be --computed--;
     line 35, "E2(+Y1-)" should be --E2(=Y1)--.

Col. 4, line 19, delete "grams" (first occurrence).

Col. 7, line 11, "for the" should be --of--; "of" should be "for the--.

Col. 9, line 31, "Q/a$\rightarrow$k"" should be --Q/a$\rightarrow$k'--.

Col. 11, line 29, "Q>R" should be --Q>R--.

Col. 12, line 5, "A<R" should be --Q<R--;

Col. 13, line 20, "aftr" should be --after--;
     line 64, "aftr" should be --after--.

Signed and Sealed this

Nineteenth Day of November 1985

[SEAL]

Attest:

DONALD J. QUIGG

Attesting Officer     Commissioner of Patents and Trademarks